No. 624,442. Patented May 9, 1899.
H. H. BAKER, Jr.
BICYCLE CONSTRUCTION.
(Application filed Mar. 21, 1898.)
(No Model.)
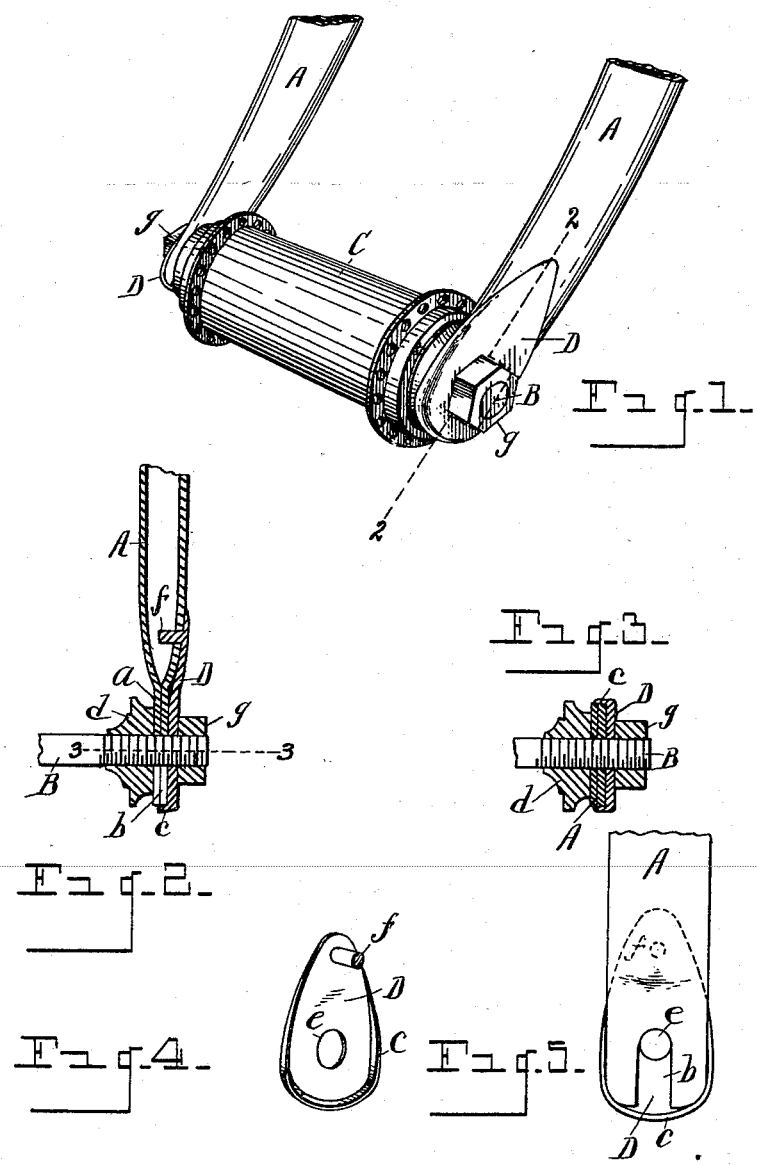
WITNESSES.
INVENTOR.
Henry H. Baker, Jr.
By
Attorneys.

UNITED STATES PATENT OFFICE.

HENRY H. BAKER, JR., OF BUFFALO, NEW YORK, ASSIGNOR TO THE GRAND RAPIDS CYCLE COMPANY.

BICYCLE CONSTRUCTION.

SPECIFICATION forming part of Letters Patent No. 624,442, dated May 9, 1899.

Application filed March 21, 1898. Serial No. 674,587. (No model.)

*To all whom it may concern:*

Be it known that I, HENRY H. BAKER, Jr., a citizen of the United States, residing at Buffalo, in the county of Erie, State of New York, have invented certain new and useful Improvements in Bicycle Construction; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to bicycle construction, and more particularly to the class known as "safety rigid frame."

The invention consists in the construction and arrangement of parts hereinafter set forth, and pointed out particularly in the claim.

The object of the invention is to provide a combined washer and confining-plate adapted to embrace the lower end of the fork side and having an aperture for the axle therethrough, the arrangement being such as to afford a reinforcement for the slotted end of the fork side which receives the axle and to prevent the axle from dropping from the fork should the axle-nuts become loose. This object is attained by the construction and arrangement of parts illustrated in the accompanying drawings, in which—

Figure 1 is a perspective view of the lower ends of a front fork supporting the front hub and axle and showing the application of my invention. Fig. 2 is a section as on line 2 2 of Fig. 1. Fig. 3 is a section as on line 3 3 of Fig. 2. Fig. 4 is a perspective view of the inner face of the retaining-plate, showing the projecting flange which embraces the end of the fork side. Fig. 5 is an elevation of the inner face of the fork side, showing the retaining-plate embracing the lower end thereof.

Referring to the letters of reference, A designates the fork side, which is of the ordinary construction, being of tubular formation, with the lower end flattened, as at $a$, and provided with the open slot $b$ to receive the axle B, which passes through the hub C of the wheel and which carries the bearing-cones $d$, all of which parts are as commonly made.

D designates a combined washer and retaining-plate, which is somewhat oblong in shape and of such width at its widest end as to project slightly beyond the edges of the fork side. The wide end of said plate is rounded and provided with a laterally-extending flange $c$, which projects from the sides and end of said plate and is adapted to embrace the edges and lower end of the fork side. Formed through said plate is an aperture $e$, adapted to receive the end of the axle and registering with the open slot $b$ in the end of the fork side. Projecting from the inner face of the upper end of the plate D is a pin $f$, adapted to enter an aperture in the fork side, as shown in Fig. 2, to retain said plate in position. Upon the outer end of the axle is a nut $g$, which is adapted to screw against the face of said plate, and thereby bind the fork side between said nut and the cone upon the axle.

By reason of the embracing-flange $c$ on the plate D a reinforcement is provided for the slotted lower end of the fork side which materially strengthens the slotted end of the fork, obviating the liability of breaking off either of the prongs thereof. By the use of these retaining-plates D, provided with the aperture $e$, which receives the ends of the axle, the axle cannot drop from the slots $b$ in the fork side even though the nuts $g$ should work loose upon the axle, for the reason that the pin $f$ upon said plates entering an aperture in the fork sides maintains said plates in their proper position and retains the axle within the slots of the fork. Said plates also serve as the outer washer, against which the nuts $g$ are screwed, besides adding a durable and ornamental finish to the fork.

Should it be desired to remove the axle from the fork, the nuts $g$ are unscrewed and the plates D withdrawn, so as to disengage the pins $f$ from the apertures in the fork side, when the axle will be free to be removed from the slots in the fork.

The inner faces of the plates D are made to conform to the shape of the fork side, as shown in Fig. 2, so as to lie closely thereto, and may be of any suitable formation to attain the object desired.

Having thus fully set forth my invention, what I claim as new, and desire to secure by Letters Patent, is—

The combination with the wheel-axle, the slotted fork having an open end adapted to receive the axle, the flanged plate or washer embracing the slotted end of the fork side and having therethrough an aperture in which the end of the axle lies, the projecting pin adapted to attach said plate to the fork side, and the axle-nut screwing against said plate.

In testimony whereof I sign this specification in the presence of two witnesses.

HENRY H. BAKER, JR.

Witnesses:
CARL F. GEYER,
KATHRYN ELMORE.